W. J. QUINN.
RAIL JOINT.
APPLICATION FILED MAR. 29, 1922.
1,432,301.
Patented Oct. 17, 1922.
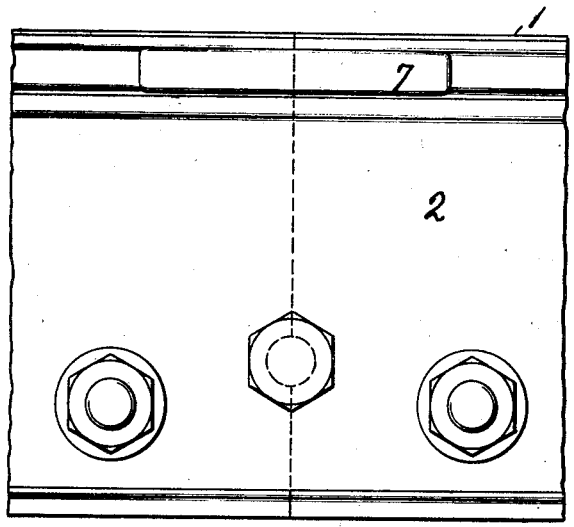
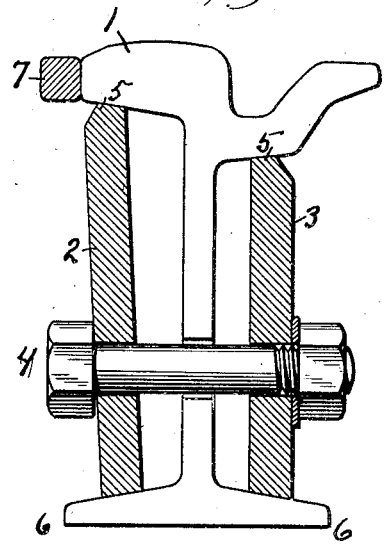
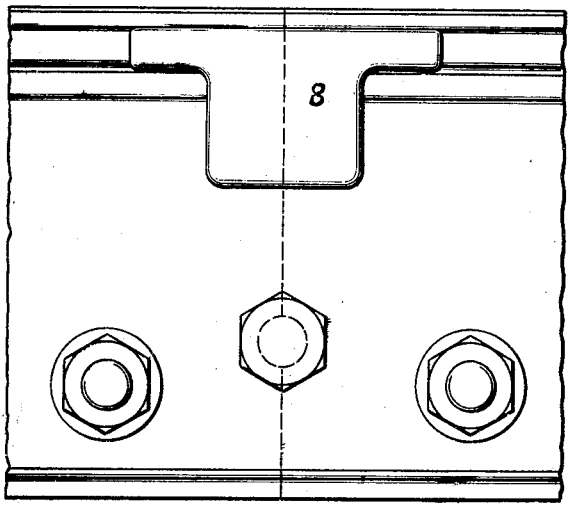
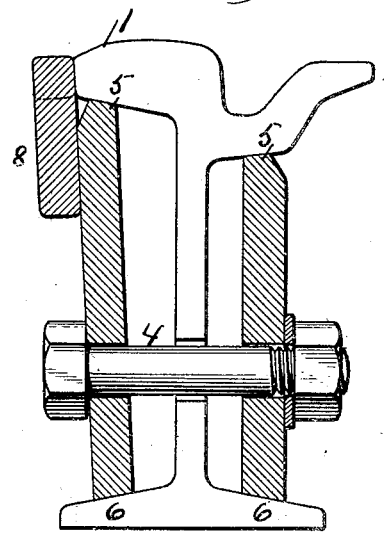
WITNESSES
Oliver W. Holmes
INVENTOR
Walter J. Quinn
BY Knight Bro
ATTORNEY Patented Oct. 17, 1922.

1,432,301

UNITED STATES PATENT OFFICE.

WALTER J. QUINN, OF NEW YORK, N. Y.

RAIL JOINT.

Application filed March 29, 1922. Serial No. 547,725.

*To all whom it may concern:*

Be it known that I, WALTER J. QUINN, a citizen of the United States, and a resident of the city, county, and State of New York, have invented certain new and useful Improvements in Rail Joints, of which the following is a specification.

This invention has for its object the securing of more perfect and rigid alignment of the rail ends by additional reinforcement to the ordinary fish plate or other common forms of rail joints. To function successfully, the rail joint must maintain permanent contact between the upper surface of the joint plates and the under sides of the head of the rail where it is supported by the joint plate. To accomplish this, resort has been had to seam welding, by which the top edge of the joint plate has been electrically welded to the under side of the heads of the abutting rails. However, at the point of the connection known as the "run on rail," it has been found that failure of seam welding is likely to occur, due to the effect on the head of the rail and the welding seam immediately under of impact of the wheel load as the wheel leaves one rail and moves on to the "run on rail." Undoubtedly, the fact that the head is discontinuous at the joint and, therefore, that the metal of the head is more severely strained at the end of the "run on rail," thereby causing a slight internal distortional movement in the head at this point, is responsible for the gradual separation of the head from the seam welding. As this phenomenon continues, the extent of the failure increases until the condition of so-called "cup joint" exists, from which time the failure of the joint is rapid. To overcome this tendency for the head of the rail to become unduly distorted at this point, it is proposed to weld a strip or plate to the outside faces of the heads of the abutting rails at the joint so that mutual support of the heads of the rails may be obtained at and close to their abutting ends. Welding would preferably be done by what is generally termed "resistance welding"; but it may also be done by the seam process, or in any other well known manner. Another form of this application would be as shown, in which case the welded bar or strip would be made of sufficient width to extend down and upon the joint plate to which it can be welded by any suitable welding process thus further adding rigidity and strength to the entire joint.

In the drawings:—

Figure 1 is a side elevation of the joint.

Figure 2 is a section through the joint.

Figure 3 is a side elevation of the joint with welded bar extending over the joint plate.

Figure 4 is a section of the same.

In the drawings, I have shown an ordinary street car rail 1 with the usual fish plates 2 and 3 held to the rail both by the fish bolts 4 and by welds at the points of contact with the rail head at 5 and the rail foot at 6. In carrying out my invention, I apply an additional plate 7 which I weld by any of the usual processes to the side of the rail head. This plate, by straddling the joint, reinforces the fish plate and holds the heads of the two adjacent rails rigidly together and so prevents the slight initial distortion which starts the breaking down of the fish joint.

In Figures 3 and 4, I show a modified form of head plate which is made deep enough to extend down over part of the outside fish plate as seen at 8, at which point it may be also welded to the plate, thus giving a double reinforcement and adding materially to the shearing strength of the joint. This development must not be extended too far, however, on account of the practical difficulty of obtaining the necessary temperature over an extended area without injury to the rail.

With the means herein disclosed, the welding zones are all very restricted so that no upsetting of the surface of the rail takes place and consequently no after dressing with tools or grinders is required which results in considerable economy of time and money.

While I have shown my invention as applied to an ordinary fish plate joint, it will be readily seen that it would also apply in its broadest sense to a joint in which for instance the lower part of the rails were held together by a clamp or by a thermit weld.

With my improvement, standard fish plates may be used, as will be seen from the drawings and the reinforce plate may be put on at the time the rails are laid or at any time thereafter.

With this simple expedient, it has been found that much greater life of rail and joint may be secured.

I claim:

1. A rail joint having a reinforcing strip welded only to the sides of the adjacent rail heads.

2. In a rail joint, the combination of a fish plate and a reinforcing piece welded to the sides of the adjacent rail heads across the joint.

3. In a rail joint, the combination of a fish plate welded at its upper edge to the head of the rail and a reinforcing piece welded to the sides of the adjacent rail heads across the joint.

4. In a rail joint, the combination of a fish plate and a reinforcing piece locally welded to the sides of the rail heads and extending down across the front of the fish plate.

WALTER J. QUINN.